United States Patent

[11] 3,530,783

| [72] | Inventor | Leo Alamprese, |
| | | Wood Dale, Illinois |
| [21] | Appl. No. | 790,693 |
| [22] | Filed | Jan. 13, 1969 |
| [45] | Patented | Sept. 29, 1970 |
| [73] | Assignee | Honeywell Inc. |
| | | Minneapolis, Minnesota |
| | | a corporation of Delaware |

[54] DAMPER APPARATUS AND MOUNTING CLIP TO HOLD AN INFLATABLE SEALING MEMBER
11 Claims, 5 Drawing Figs.

[52] U.S. Cl. .................................................. 98/110,
98/121, 49/488, 49/493
[51] Int. Cl. ................................................ F24f 13/08
[50] Field of Search ......................................... 98/107,
110, 121; 49/91, 92, 479, 483, 485, 486, 488,
489, 493, 494

[56] References Cited
UNITED STATES PATENTS

| 2,070,725 | 2/1937 | Gail | 49/493 |
| 2,686,943 | 8/1954 | Kunkel | 49/488 |
| 2,805,453 | 9/1957 | Petronello | 49/488 |

FOREIGN PATENTS

| 375,014 | 6/1932 | Great Britain | 49/92 |

Primary Examiner—Meyer Perlin
Attorneys—Lamont B. Koontz, Francis A. Sirr and John S. Sumners ABSTRACT: A damper apparatus and a mounting clip to mount an inflatable sealing member along the edge of a damper blade, the clip being bent to generally conform to the shape of the edge of the blade to facilitate the mounting of the clip on the blade by pressure directed toward the edge of the blade, with a flexible sealing member mounted on the clip by means of two grooves which hold the edges of the sealing member in a manner to cause the sealing member to assume a generally teardrop shape, the sealing member having inlet openings to cause the sealing member to be inflated when the damper is closed.

Patented Sept. 29, 1970 3,530,783

INVENTOR.
LEO ALAMPRESE

BY Francis A. Sirr

ATTORNEY.

ial number 3,530,783

DAMPER APPARATUS AND MOUNTING CLIP TO HOLD AN INFLATABLE SEALING MEMBER

SUMMARY OF THE INVENTION

The present invention is an improvement upon U.S. Pat. No. 3,366,032 wherein rivets hold an inflatable sealing member directly on the longitudinal edge of a damper blade.

Prior art structures are satisfactory. However, structures in accordance with the teachings of the present invention reduce the cost of manufacturing, considerably reduce the difficulty of replacing a worn inflatable sealing member, and allow the inflatable seal to be selected as an option.

Specifically, the invention utilizes a resilient mounting clip which is constructed and arranged to form a pocket to receive and hold the longitudinal edge of the damper blade. The clip conforms generally to the cross-sectional shape of the edge of the blade and can be mounted on the blade by a force directed toward the edge of the blade. The snap-on method of mounting provides semi-permanent retention of the clip and associated structure on the edge of the damper blade.

An elongated flexible sealing member is mounted on the clip so that an edge of the sealing member is positioned on each side of the blade. Specifically, the clip is provided with two longitudinal grooves, one positioned on each side of the blade, each of which receives an edge of an elongated flexible sealing member. The sealing member loosely covers the clip and longitudinal edge of the blade in a generally teardrop profile. The two longitudinal grooves are unequally spaced inwardly from the edge of the blade to force the teardrop profile toward the side of the blade which mates with a cooperating member when the damper is closed. In the closed position, inlet openings in the sealing member face upstream to cause the sealing member to be inflated.

DESCRIPTION OF THE PREFERRED EMBODIMENT

Figure 1:
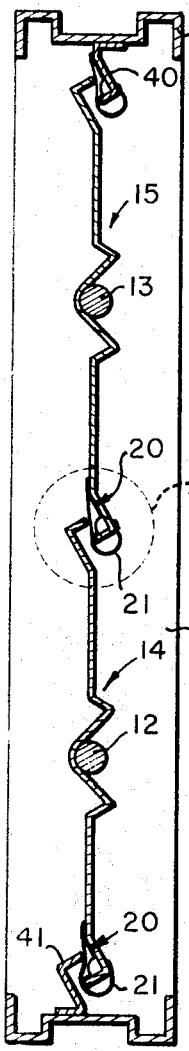
FIG. 1 is a broken-away view of a damper apparatus utilizing the invention.
Figure 2:
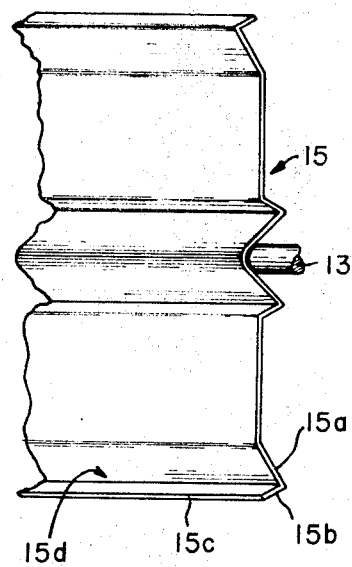
FIG. 2 is a partial perspective view of a damper blade.

Referring to FIG. 1, a damper apparatus 10 includes a rectangular frame 11 with a central air flow passage therethrough. Pivotally mounted within the frame, on axles 12 and 13, respectively, are a pair of damper blades 14 and 15. The blades are attached to the axles by appropriate means. The damper blades are generally flat and extend, on opposite sides of the axle, substantially in a single flat plane. The blades have two longitudinal edges extending generally parallel to their axles and adjacent these longitudinal edges, each of the blades is reverse bent as illustrated best in FIGS. 2 and 3. A longitudinal portion 15a of blade 15 is bent to form an acute angle with the plane of the blade and then a further longitudinal portion 15b is bent back toward the plane of the blade. Portion 15b terminates in the edge 15c which lies substantially in the plane of the blade. This construction results in a longitudinal groove or recess 15d adjacent portions 15a and 15b. Blade 14 is formed in a similar manner, as indicated by numerals 14a, 14b and 14c. This deformation of the longitudinal edges of the damper blades as above-described provides, as is well known, both a stiffening function and a straightening function and allows adjacent damper blades to properly engage each other along their entire length.

As seen in FIG. 1, damper blades 14 and 15 lie substantially in a single plane with their longitudinal edges lying in overlapping abutting relationship when the blades are closed. In order to provide a seal between the frame 11 and the outer edges of the blades, abutment members 40 and 41 are provided for cooperation with blades 15 and 14, respectively. The abutment members have one portion attached to frame 11 and with another portion extending transverse to the direction of the air flow and generally parallel to the plane of the blades when they are closed. It will be noted that with the blades in their closed position, the outer longitudinal edge thereof lies in abutting relationship with the cooperating abutment member.

Damper blades 14 and 15 are connected together by an appropriate linkage and driving means, not shown, for operating the damper assembly. The structure described thus far is a construction utilized in commerically available damper assemblies.

Prior art dampers provide a sealing member to reduce air leakage when the damper apparatus is closed.

Figure 3:
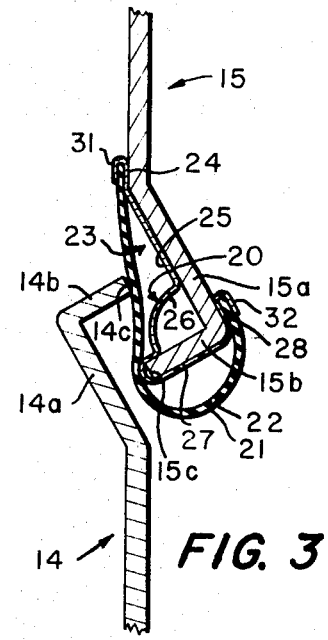
FIG. 3 is an enlarged fragmentary view taken generally as indicated in FIG. 1.

Referring to FIG. 3, portions of the two damper blades 14 and 15 are shown enlarged and in closed position wherein the blade portions 14b and 15b are in abutting relationship. An elongated metallic mounting clip 20 is positioned to cooperate with the longitudinal edge of blade 15 and to support an elongated flexible rubber-like sealing member 21 such that a portion of this sealing member is engaged by the longitudinal edge 14c of blade 14. The sealing member includes a plurality of air inlet openings 22, located on the upstream side of the closed damper apparatus. Due to the differential pressure between the downstream side and the upstream side of the damper, the void 23 between clip 20 and sealing member 21 is inflated, insuring a low leakage seal.

Figure 4:
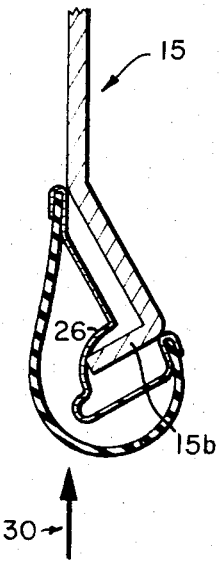
FIG. 4 is an enlarged fragmentary view showing the mounting clip and its association with the edge of the damper blade just prior to mounting.

Clip 20 includes a flat portion 24 which mates with the flat portion of the damper blade. Extending from portion 24 is a first portion 25 which terminates in a second arcuate portion 26. Arcuate portion 26 provides a void or pocket that is adapted to receive portion 15b of the blade as the clip is being mounted on the blade, as seen in FIG. 4. Clip 20 also includes a third portion 27 which extends along the portion 15b of the blade. Clip 20 terminates in a re-entrant fourth portion 28. The flat portion 24 and the fourth portion 28 of the clip are each provided with a longitudinal groove which receives the side portions of sealing member 21. The longitudinal grooves in clip 20 are displaced inwardly from the longitudinal edge 15c of the blade, the groove in flat portion 24 being placed farther from the longitudinal edge of the blade than is the groove at the portion 28 of the clip. Thus, as can be seen in FIG. 4, sealing member 21 takes a generally teardrop profile, the profile being forced toward the portion of the damper blade which engages a mating member when the damper apparatus is closed. The teardrop profile can be controlled by changing the position of the longitudinal grooves in clip 20.

In FIG. 4, spring clip 20 is shown in separated relationship to the longitudinal edge of the blade prior to a force being applied to the clip in the direction indicated generally by arrow 30. When this force is applied, the arcuate portion 26 of the clip receives the portion 15b of the damper blade, the clip deforms slightly, and the clip and sealing member snap into position, as shown in FIG. 3.

Figure 5:
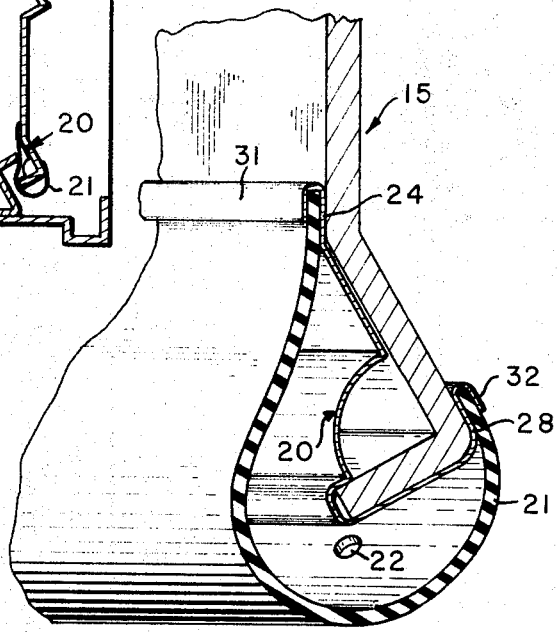
FIG. 5 is an enlarged perspective view of the mounting clip, sealing member and damper blade.

FIG. 5 is a perspective view of the clip, the flexible sealing member and the damper blade. In this view, the continuous longitudinal grooves 31 and 32 can be seen. The continuous grooves insures a more complete seal of the sealing member to the clip and facilitates better inflation of the sealing member when the damper is in the closed position. The longitudinal edges of the abutment members 40 and 41 have deformed portions as do the edges of the damper blades, and also carry the above-described clip and sealing member to facilitate sealing of portion of the damper apparatus.

I claim:

1. A mounting clip for use with a movable damper having a longitudinal edge, said edge including a deformed portion to provide a stiffening function, the clip comprising: a resilient member constructed and arranged to form a pocket which is adapted to receive and hold the longitudinal edge and deformed portion of the damper, to mount said member thereon and to form first and second portions of different lengths which engage opposite sides of the damper, said resilient member being adapted to receive an elongated flexible sealing member having one edge adapted to be mounted on the first portion of said resilient member and another edge adapted to be mounted on the second portion of said resilient member whereby said sealing member loosely covers said resilient member.

2. A mounting clip as defined in claim 1 in combination with said flexible sealing member, said sealing member further having air inlet openings to facilitate inflation of said sealing member when the damper is closed.

3. A mounting clip as defined in claim 2 including a longitudinal groove formed in each of said first and second portions of said resilient member to receive said one edge and said another edge of said sealing member, wherein one of said longitudinal grooves is located at a position which is a further distance from the longitudinal edge of the damper than is the other longitudinal groove.

4. In combination; a generally flat damper having a blade which is adapted to be pivoted about a longitudinal axis, said blade having a generally flat portion defining the plane of the blade, a first portion which extends from said flat portion a first distance and is bent to form an obtuse angle with said flat portion, and a second portion which extends from said first portion a second distance and bent back toward the plane of the blade to form a longitudinal edge of said blade;

a mounting clip having a flat portion adapted to mate with said generally flat portion of said blade; a first portion which extends from said flat portion a distance shorter than the first portion of said blade and bent to form an obtuse angle with the flat portion of said clip; a second portion which extends from said first portion in a direction to receive the second portion of said blade; a third portion which extends from said second portion in a direction toward the second portion of said blade a distance substantially equal to said second portion of said blade; and a fourth portion which extends from said second portion and mates with the first portion of said blade; and an elongated flexible sealing member loosely covering the longitudinal edge of said blade, said sealing member having one edge attached to the flat portion of said clip and having another edge attached to the fourth portion of said clip.

5. The combination as defined in claim 4 wherein said second portion of said spring clip is an arcuate portion which receives the second portion of said blade when said clip is mounted on said blade by a force which is directed toward the longitudinal edge of said blade to thereby momentarily deform said clip.

6. The combination as defined in claim 4 wherein the flat portion of said clip is located at a position which is a further distance from the longitudinal edge of said damper than is the fourth portion of said clip.

7. The combination as defined in claim 6 wherein said flexible sealing member includes air inlet openings adjacent said fourth portion of said clip and is adapted to be inflated when said damper is closed.

8. The combination as defined in claim 7 including a further member cooperating with said blade, said further member having a longitudinal edge to engage said blade in overlapping abutting relationship with the longitudinal edge of said damper and engaging said sealing member in the vicinity of said one edge of said sealing member, to define the closed position of said damper and to define an upstream side of said damper adjacent said fourth portion of said clip.

9. The combination as defined in claim 7 wherein a longitudinal groove is formed in each of said flat portions and said fourth portion of said clip, said flexible sealing member being attached to said clip by engagement with said grooves.

10. The damper apparatus comprising:

a frame having spaced longitudinal frame members defining opposite sides of the damper apparatus, and having longitudinal abutment members, each of which has a deformed portion and is adapted to be engaged by the longitudinal edge of the adjacent damper blade, each longitudinal damper blade edge having a deformed portion;

a plurality of spaced, generally flat and elongated damper blades, each of which is mounted in said frame and is adapted to be pivoted about a longitudinal axis, each of said damper blades having a first and second longitudinal edge, each edge including a deformed portion to provide a stiffening function, the first edge of one damper blade being adapted to be engaged by the second edge of an adjacent damper blade; and a plurality of elongated mounting clips of substantially the same length as said damper blades, one of which is mounted on only the first longitudinal edge of said plurality of damper blades and one of which is mounted on only one of said abutment members which is adapted to engage the second longitudinal edge of its adjacent damper blade, each of said mounting clips including a resilient member constructed and arranged to form a pocket to receive and hold the first longitudinal edge and deformed portion of a damper blade or said one of said abutment members, and an elongated flexible sealing member having one edge mounted on a first portion of said mounting clip which is on the side of a damper blade or abutment member which is adapted to be engaged by the adjacent damper blade, and having another edge mounted on a second portion of said mounting clip which is on the other side of the damper blade or abutment.

11. A damper apparatus as defined in claim 10 wherein each of said elongated flexible sealing members includes openings adjacent said second portion of said mounting clip.